UNITED STATES PATENT OFFICE.

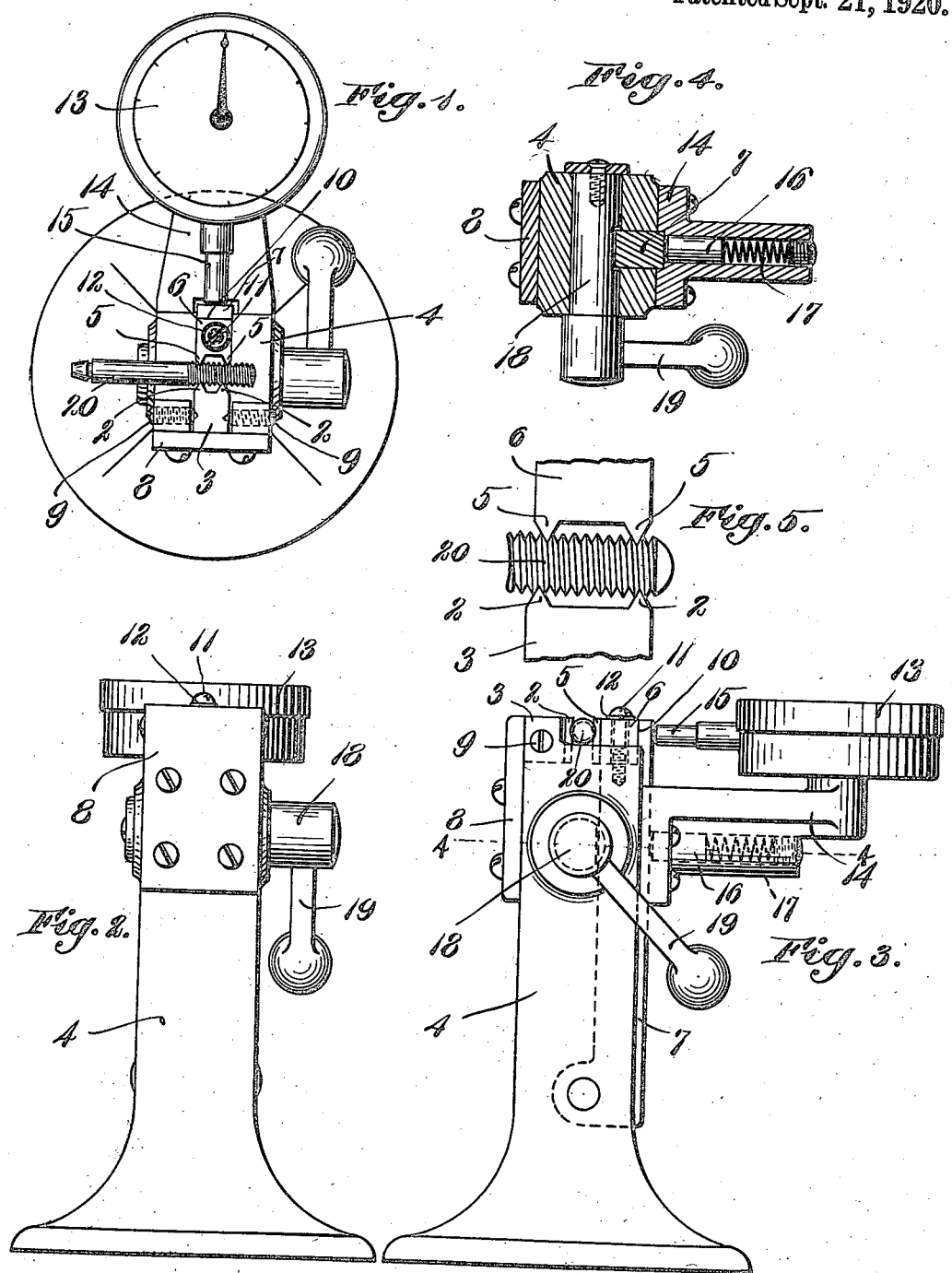

RILEY HERBERT PARKER, OF WINTHROP, MASSACHUSETTS, ASSIGNOR TO GILLETTE SAFETY RAZOR COMPANY, OF BOSTON, MASSACHUSETTS, A CORPORATION OF DELAWARE.

SCREW-THREAD GAGE.

1,353,608.   Specification of Letters Patent.   Patented Sept. 21, 1920.

Application filed November 1, 1918. Serial No. 260,679.

*To all whom it may concern:*

Be it known that I, RILEY HERBERT PARKER, a citizen of the United States, residing at Winthrop, in the county of Suffolk and State of Massachusetts, have invented certain new and useful Improvements in Screw-Thread Gages, of which the following is a specification.

The object of my invention is to provide a simple and accurate gage by means of which a screw thread can be quickly and easily tested with reference to its capacity to enter the nut or equivalent threaded recess which it is intended to fit. A screw is liable to be inaccurate with respect to either pitch or diameter or both, but it sometimes happens that an inaccuracy in pitch is compensated for by an inaccuracy in diameter, or vice versa, and in such case the screw can still be used with a nut which it would fit if accurately formed. My screw thread gage includes means for testing both the pitch and the diameter of a screw and for indicating any such inaccuracy in either dimension as will render the screw unfit for its intended use, but the construction is such that if an inaccuracy in one dimension is compensated for by an inaccuracy in the other dimension the reading of the gage is the same as it would be if neither inaccuracy existed, thereby showing that the screw is suitable for use.

The features of construction and arrangement by which the result above described is obtained and in which my invention resides are hereinafter described in connection with the accompanying drawing, in which—

Figure 1 is a top plan view of my gage as preferably constructed, showing a screw in the position which it occupies while being tested;

Fig. 2 is a front elevation of the gage shown in Fig. 1;

Fig. 3 is a side elevation of the same as viewed from the right with reference to Figs. 1 and 2;

Fig. 4 is a detail view in horizontal section on the line 4—4 in Fig. 3, and

Fig. 5 is a detail view on an enlarged scale, showing the abutments which engage the screw while being tested.

In constructing my gage I employ four abutments arranged in two opposed pairs which are capable of relative movement toward and away from each other and are adapted to receive between them and engage simultaneously the screw to be tested. In the device illustrated the abutments 2—2, constituting one pair, are formed on and project rearwardly from the rear edge of a plate 3 secured in horizontal position in a slightly wider recess in the top of a standard 4, and the abutments 5—5 constituting the other pair are formed on and project forwardly from the front edge of another horizontal plate 6 carried by the upper end of an upright arm 7 pivoted at its lower end to the standard 4 on a transversely extending axis, whereby the relative movement of the two pairs of abutments is provided for. Each of the abutments has a V-shaped edge cut on an angle corresponding exactly with the angle between adjacent threads of an accurately-cut screw which is the standard for the gage, and the abutments constituting each pair are separated from each other by a distance which is a predetermined multiple of the exact distance between adjacent threads of the standard screw and is preferably about equal to the length of the nut or other threaded recess which the screw is intended to fit.

The plate 3 is accurately positioned in a forward and backward direction by the engagement of its front edge with a stop shoulder provided by an upright plate 8 secured to the front side of the standard 4. A pair of screws 9 passing laterally in opposite directions through the upper end of the standard serve to position the plate 3 in a lateral direction, and preferably these screws 9 have conical ends which enter similarly-shaped recesses formed in the side edges of the plate 3 and so arranged that when the screws are turned inward their conical points act as cams to force said plate downward on the top of the standard and also forward against the plate 8. This arrangement enables the plate 3 to be adjusted laterally by loosening one screw 9 and tightening the other, and also enables said plate to be readily removed and replaced by another having differently shaped or spaced abutments thereon, according to the predetermined standard for the screws to be tested. The plate 6 also is detachably secured to the upper end of the arm 7, and is positioned in a forward and backward direction by the engagement of its rear edge with a stop shoulder 10 formed on said arm, but provision is made for a certain amount of free lateral movement of this plate in order to enable the abutments 5—5 to adjust themselves automatically to the threads of a screw positioned on the fixed abutments 2—2 when pressed against said screw. This is done, in the construction illustrated, by attaching the plate 6 to the top of the arm 7 by means of a screw 11 which passes through a slightly larger perforation in the plate, thereby enabling the latter to move laterally to a slight extent with respect to the screw. The plate 6 is prevented from moving except under pressure by a friction device shown as a spring washer 12 made of sheet metal and held under compression between the plate and the head of the screw 11. The friction exerted on the plate 6 by the washer 12 can be adjusted by turning the screw 11 in one direction or the other, while by removing the screw the plate 6 can be removed and replaced by another having differently shaped or spaced abutments, corresponding to those on any selected plate 3.

In connection with the parts above described I provide an indicating device preferably consisting of an ordinary dial gage 13, which is shown as carried face upward by a bracket 14 secured to the standard 4 with the stem 15 of the gage bearing at its free end against the rear face of the arm 7 at the upper end of the latter. This arm is pressed forward by a plunger 16 adapted to slide in the bracket 14 and having a compression spring 17 behind it, and while it may be moved in the opposite direction by hand I prefer to employ for this purpose a transversely-extending rod 18 journaled in the standard 4 and provided at one end with an operating handle 19. Between its ends the rod 18 crosses the arm 7 and is cut away on one side directly in front of the arm, so that when the rod and handle are in the position illustrated in the drawing the arm 7 is free to move forward under the pressure of the spring 17 until arrested by the engagement of the pairs of abutments 2—2 and 5—5 with a screw placed between them, but when the handle 19 is moved from this position in either direction the rod 18 acts as a cam to force the arm 7 backward, thereby separating the pairs of abutments. The device is used by separating the pairs of abutments as just described, then placing between them the screw to be tested (represented in Fig. 1 by the threaded rod 20) and holding it against the fixed abutments 2—2, and then returning the handle 19 to the position illustrated, whereupon the spring 17 moves the arm 7 forward and forces the abutments 5—5 into engagement with the screw. The latter abutments automatically take a position in which they can enter between the corresponding threads of the screw to the maximum extent and if the screw is accurately cut according to the predetermined standard all four abutments make a close fit with the screw thread simultaneously, as shown in Fig. 5. When this condition exists the stops 8 and 10 are separated by a predetermined distance which is indicated by the position of the needle of the dial gage 13, and preferably this gage is so adjusted that its reading in such circumstances is zero. The same reading will be obtained if the screw is inaccurate in respect to both pitch and diameter provided these inaccuracies are such as to compensate for each other, but in such case the screw will enter the nut or other threaded recess which it is intended to fit and its capacity to do this will be indicated by the zero or normal reading of the gage. If, however, the screw being tested is inaccurate in pitch but not in diameter, or vice versa, or if it is inaccurate in both dimensions but these inaccuracies are not such as to compensate for each other, the extent to which one or the other pair of abutments will enter between the screw threads will not be the same as in the case of a standard screw and the resulting variation in the distance between the stops 8 and 10, as indicated by the gage, will show the unfitness of the screw for its intended use.

The means employed for supporting the abutments and indicating their relative position can be widely varied without departing from my invention, which resides primarily in the pairs of abutments arranged to operate as above described.

I claim:—

1. A screw thread gage comprising two pairs of abutments capable of relative movement toward and away from each other and shaped and spaced to enter and fit simultaneously at separated points an accurately-formed screw thread of predetermined dimensions, the abutments of each pair being located at a fixed distance apart and having an unobstructed space between them and the abutments constituting one pair being movable lengthwise of the screw, and means for indicating the separation of the pairs of abutments when pressed against a screw placed between them.

2. A screw thread gage comprising two opposed members capable of relative movement toward and away from each other and each provided with a pair of relatively fixed abutments shaped and spaced to enter and fit simultaneously at separated points an accurately-formed screw thread of predetermined dimensions, one of said members being movable lengthwise of the screw, and means for indicating the separation of the pairs of abutments when pressed against a screw placed between them.

3. A screw thread gage comprising a fixed support and a movable support provided with opposed stops, means for pressing the supports toward each other, means for indicating the position of the movable support, two plates carried by the supports respectively and bearing against the corresponding stops, each plate being provided with a pair of abutments shaped and spaced to enter and fit simultaneously at separated points an accurately-formed screw thread of predetermined dimensions, means for detachably securing one of said plates to its support and providing for a limited free movement of the plate thereon, and means for adjusting the other plate lengthwise of a screw placed between them.

Signed at Boston, Mass., this 29th day of October, 1918.

RILEY HERBERT PARKER.